Patented May 8, 1934

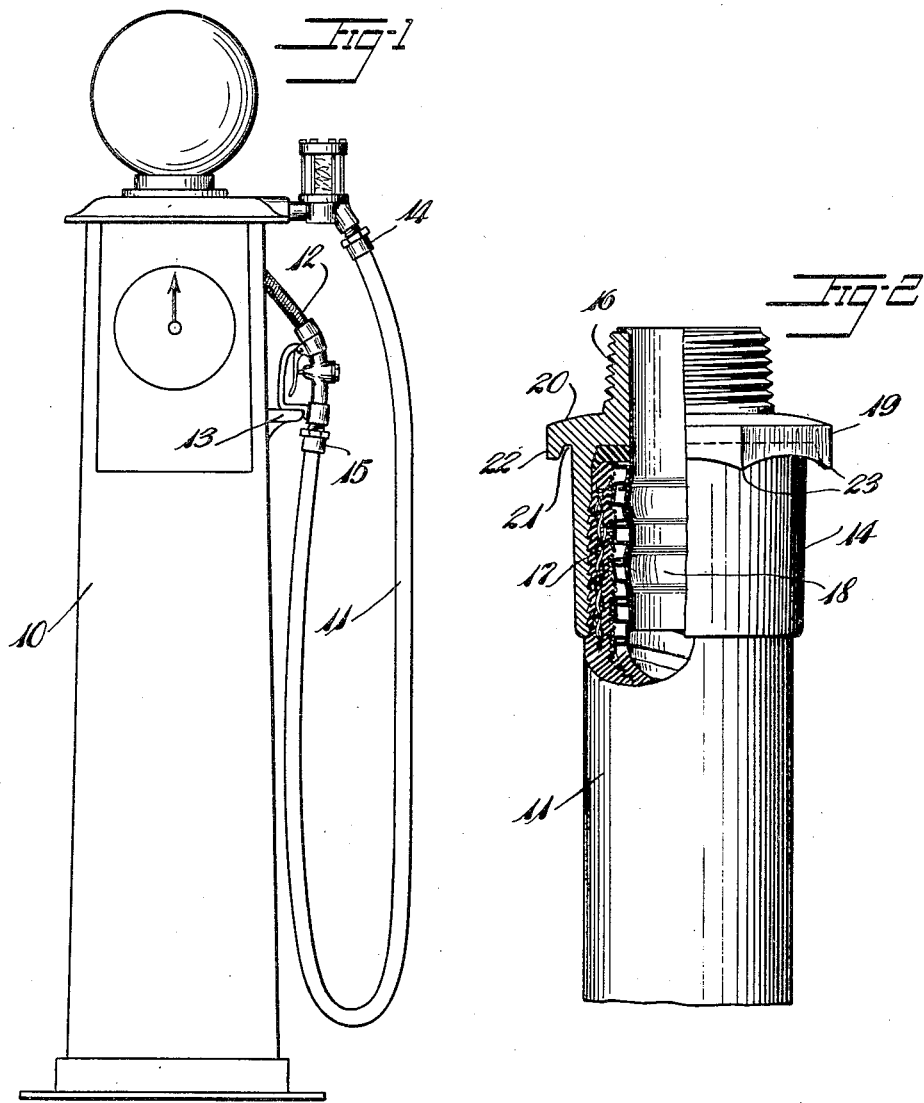

1,958,125

UNITED STATES PATENT OFFICE 1,958,125

HOSE COUPLING

Harry A. Bourne and Charles C. Cadden, Akron, Ohio, assignors to The B. F. Goodrich Company, New York, N. Y., a corporation of New York Application May 17, 1933, Serial No. 671,490

7 Claims. (Cl. 285—71)

This invention relates to hose couplings and especially to couplings for rubber covered hose used for conducting gasoline and other fluids which cause swelling, softening and blistering of rubber by contact therewith.

In such installations as gasoline dispensing stations for motor vehicles it is sometimes desired that the hose be rubber covered to resist abrasion, as when it is dragged upon concrete, but owing to leakage of the gasoline at joints beyond the hose coupling, through no fault of the coupling itself or the hose, the hose and coupling joint are detrimentally affected. The gasoline flows or creeps along the coupling surface onto the rubber cover of the hose and causes swelling, softening and blistering of the latter, and, being very penetrating, sometimes undermines the security of the coupling joint and causes failure of it. The difficulty is aggravated by the ease and rapidity with which gasoline flows and spreads on metal and rubber surfaces.

The chief objects of the invention are to provide an improved coupling by which the gasoline or other liquid leaking onto its surface is effectively prevented from reaching the hose surface, and to provide durability, ruggedness and attractive appearance in the structure of the coupling.

These and further objects will be apparent from the following description, reference being had to the accompanying drawing in which:

Fig. 1 is a front elevation of a fuel dispensing pump and hose including couplings constructed according to and embodying the invention in its preferred form.

Fig. 2 is an elevation, with parts broken away and in section, of one of the couplings and its associated hose end.

Referring to the drawing, a conventional fuel dispensing pump 10 has coupled to it at its upper end a hose 11 which terminates in a nozzle 12 and in its idle position hangs in a loop with the nozzle end supported on a bracket 13 on the pump. In most installations the pump end of the hose extends downwardly and obliquely from the pump and the supported nozzle end of the hose is suspended usually in a vertical or nearly vertical position, as shown.

The two hose ends may be coupled by couplings 14 and 15 of similar construction and only one need be described in detail, referring especially to Fig. 2. At the end opposite a threaded end 16, the body of the coupling is formed with an annular chamber 17 for the reception of the hose end which latter is held compressed in sealing relation against the wall of the coupling chamber by an expanded internal nipple 18.

The coupling according to this invention is provided with a circumferentially extending, umbrella-like skirt 19, preferably integral with the body of the coupling and disposed as high on the body as possible, desirably at the base of the threaded portion 16, to be well away from the exposed surface of the hose. The skirt is formed with a downwardly and outwardly sloping top 20 and is annularly recessed at its underside at 21 to provide an annular drip lip 22 which is spaced sufficiently from the coupling body so that drops of liquid can form on the drip lip and fall therefrom without touching the outer wall of the coupling body. The outer wall of the recess 21, which is the inner wall of the skirt, is approximately vertical so that it is difficult even for gasoline to climb this surface, and as a further safeguard against travel of the fluid to the coupling body, the recess 21 is deep-cut and is of sufficient width throughout its depth so that a drop of gasoline by any chance hanging in the recess cannot by virtue of the thickness of the drop span the gap between the inner and outer walls of the recess.

The lower margin of the drip lip is preferably scalloped to provide gathering projections 23, 23 for the liquid, and the sides of the skirt between these gathering projections are preferably flat to provide a polygonal shape of the skirt for engagement by a manipulating wrench to couple and uncouple the hose.

The sloping top 20 expedites flow of the leaking liquid to the skirt margin, and in the case where the coupling is inclined as at 14 in Fig. 1, the liquid flows to the lowermost portion of the skirt margin. By this construction the easiest course for the liquid to take is to gather in drops at the drip lip and fall off, and creeping of the liquid to the body wall is hampered also by the climb the liquid must take at the inside of the skirt in order to reach the wall of the body. Whether the coupling be vertical or inclined, the liquid gathers at the drip lip and drops into the air without touching the coupling body or the hose itself, at least in the region of the coupling. The drops usually are sufficiently scattered in falling so that but little of the liquid contacts the hose at all and then only at its middle region where its presence in small amounts is not materially objectionable.

The coupling body including the skirt may be cast or otherwise formed as an integral metal unit of sufficient wall thickness throughout so as to be durable and rugged, and the construction is such as to be of neat appearance.

We claim:

1. A gasoline hose coupling comprising a metal body portion surrounding the hose end and a circumferentially extending skirt provided at its margin with a drip lip sufficiently spaced from structure radially inward thereof to permit drops of gasoline upon the skirt to gather at the lip and drop off without touching said structure, said skirt being integral with the body portion and providing a rugged guard for the adjacent structure.

2. A gasoline hose coupling comprising a metal body portion surrounding the hose end and a circumferentially extending skirt integral with the body portion, said skirt being provided at its margin with a drip lip sufficiently spaced from structure radially inward thereof to permit drops of gasoline upon the skirt to gather at the lip and drop off without touching said structure.

3. A hose coupling comprising a metal body portion having a threaded end and a hose-engaging end, and a circumferentially extending skirt integral with said body portion and disposed between the threaded end and the hose-engaging end thereof, said skirt being provided at its margin with a drip lip sufficiently spaced from structure radially inward thereof to permit drops of liquid upon the skirt to gather at the lip and drop off without touching said structure, and said skirt and its margin providing a rugged tool-engaging portion for applying the coupling.

4. A hose coupling comprising a body portion surrounding the hose end and a circumferentially extending skirt, said skirt having an outer surface sloping outwardly and away from the free end of the coupling and terminating at the margin of the skirt in a scalloped drip lip.

5. A hose coupling comprising a body portion surrounding the hose end and a circumferentially extending skirt having a polygonal outermost margin, said skirt having an outer surface sloping outwardly and away from the free end of the coupling and terminating at the margin of the skirt in a drip lip.

6. A hose coupling as defined in claim 5 in which the drip lip margin of the skirt is scalloped.

7. A gasoline hose coupling comprising a body portion having a threaded end and a hose-engaging end, and a circumferentially extending skirt integral with said body portion and disposed between the threaded end and the hose-engaging end thereof, said skirt being provided at its margin with a drip lip sufficiently spaced from structure radially inward thereof to permit drops of gasoline upon the skirt to gather at the lip and drop off without touching said structure, said skirt having an outer surface sloping outwardly away from the threaded end of the coupling and terminating in an outer polygonal and scalloped margin providing a drip lip sufficiently spaced from the outer wall of the coupling body to permit drops of liquid to gather at the lip and drop off without touching said wall.

HARRY A. BOURNE.
CHARLES C. CADDEN.